US010158881B2

(12) United States Patent
Chen et al.

(10) Patent No.: US 10,158,881 B2
(45) Date of Patent: Dec. 18, 2018

(54) METHOD AND APPARATUS FOR MULTIVIEW VIDEO CODING AND DECODING

(75) Inventors: Ying Chen, San Diego, CA (US); Miska Matias Hannuksela, Ruutana (FI); Ye-Kui Wang, Bridgewater, NJ (US)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 12/695,819

(22) Filed: Jan. 28, 2010

(65) Prior Publication Data

US 2010/0189173 A1 Jul. 29, 2010

Related U.S. Application Data

(60) Provisional application No. 61/147,998, filed on Jan. 28, 2009.

(51) Int. Cl.
*H04N 19/573* (2014.01)
*H04N 19/597* (2014.01)
*H04N 19/61* (2014.01)

(52) U.S. Cl.
CPC ......... *H04N 19/573* (2014.11); *H04N 19/597* (2014.11); *H04N 19/61* (2014.11)

(58) Field of Classification Search
CPC ..... H04N 19/597; H04N 19/573; H04N 19/61
See application file for complete search history.

(56) References Cited

U.S. PATENT DOCUMENTS

| 6,217,234 | B1* | 4/2001 | Dewar ................ G06F 12/0207 |
| | | | 375/E7.093 |
| 2002/0057740 | A1 | 5/2002 | Yamada |
| 2005/0053148 | A1 | 3/2005 | Mukerjee |
| 2005/0084006 | A1 | 4/2005 | Lei et al. |
| 2007/0064801 | A1 | 3/2007 | Wang et al. |
| 2008/0137742 | A1 | 6/2008 | Chen et al. |
| 2009/0262804 | A1* | 10/2009 | Pandit et al. ............ 375/240.12 |
| 2009/0323824 | A1* | 12/2009 | Pandit et al. ............ 375/240.26 |
| 2010/0027615 | A1 | 2/2010 | Pandit et al. |
| 2011/0268193 | A1* | 11/2011 | Cho ..................... H04N 19/597 |
| | | | 375/240.25 |

FOREIGN PATENT DOCUMENTS

| WO | WO 2008/023967 A1 | 2/2008 |
| WO | WO 2008/048499 A2 | 4/2008 |
| WO | WO 2008/123917 A2 | 10/2008 |

OTHER PUBLICATIONS

Clear Drawing Pandit et al. (US 20090262804 A1).*

(Continued)

*Primary Examiner* — Mohammed Jebari
(74) *Attorney, Agent, or Firm* — Alston & Bird LLP

(57) ABSTRACT

A method comprises encoding a first view component of a first view of a multiview bitstream; and encoding a second view component of a second view; wherein the encoding of the second view component enables generating of a reference picture list for the second view component to include at least one of the following: (a) a first field view component based on the first view component or (b) a first complementary field view component pair including the first view component.

18 Claims, 7 Drawing Sheets

(56) References Cited

OTHER PUBLICATIONS

International Preliminary Report on Patentability for Application No. PCT/FI2010/050040 dated Aug. 2, 2011.
International Search Report and Written Opinion for Application No. PCT/FI2010/050040 dated Jun. 22, 2010.
Joint Draft on Multiview Video Coding, JVT-AB204, Hannover, Jul. 2008, 63 pages.

* cited by examiner

METHOD AND APPARATUS FOR MULTIVIEW VIDEO CODING AND DECODING

RELATED APPLICATIONS

This application was originally filed as U.S. Patent Application No. 61/147,998 on Jan. 28, 2009, which is incorporated herein by reference in its entirety.

FIELD OF INVENTION

The present invention relates generally to the field of video coding and, more specifically, to the construction of a reference picture list for multiview video coding.

BACKGROUND OF THE INVENTION

This section is intended to provide a background or context to the invention that is recited in the claims. The description herein may include concepts that may be pursued, but are not necessarily ones that have been previously conceived or pursued. Therefore, unless otherwise indicated herein, what is described in this section is not prior art to the description and claims in this application and is not admitted to be prior art by inclusion in this section.

In order to facilitate communication of video content over one or more networks, several coding standards have been developed. Video coding standards include ITU-T H.261, ISO/IEC MPEG-1 Video, ITU-T H.262 or ISO/IEC MPEG-2 Video, ITU-T H.263, ISO/IEC MPEG-4 Visual, ITU-T H.264 (also know as ISO/IEC MPEG-4 AVC), and the scalable video coding (SVC) extension of H.264/AVC. In addition, there are currently efforts underway to develop new video coding standards. One such standard under development is the multi-view video coding (MVC) standard, which will become another extension to H.264/AVC.

For inter-view prediction in progressive coding, a view (view B) is coded with inter-view prediction from another view (view A). In this case, a view component in view B uses the corresponding view component in view A as inter-view prediction reference. The reference picture list construction processes specified in the current MVC standard can be directly applied for reference field view components, but these processes lack the ability to address different field view components of a complementary field view component pair. Consequently, a field in view B can at most use either a field with the same parity or a field with the opposite parity as inter-view prediction reference. Allowing only one field view component (with the same or opposite parity) to be used as inter-view prediction reference in a non-adaptive manner is not efficient from coding efficiency point of view.

SUMMARY OF THE INVENTION

In one aspect of the invention, a method comprises encoding a first view component of a first view of a multiview bitstream; and encoding a second view component of a second view; wherein the encoding of the second view component enables generating of a reference picture list for the second view component to include at least one of the following: (a) a first field view component based on the first view component or (b) a first complementary field view component pair including the first view component.

In one embodiment, the second view component is a second field view component; and the reference picture list for the second view component includes the first field view component.

In one embodiment, the first field view component and the second field view component have opposite parities.

In one embodiment, the first view component is the first frame view component and the second view component is the second field view component, and the reference picture list for the second view component includes the first field view component based on the first frame view component.

In one embodiment, the second view component is the second frame view component, and the reference picture list for the second view component includes the first complementary field view component pair.

In one embodiment, the method further comprises encoding a third field view component, wherein the first view component is the first field view component, and wherein the first field view component and the third field view component form a complementary field view component pair.

In one embodiment, the first view component is a first frame view component, a second view component is a second field view component, a first field view component is a field view component included in the first frame view component, and a third field component is a second field view component in the first frame view component.

The updating of the reference picture list of the second field view component may comprise appending a default reference picture list with the first field view component and the third field view component. Either the first field view component or the third field view component may be appended to the default reference picture list list first if the first field view component or the third field view component is of the same parity as the second field view component.

In one embodiment, the method further comprises inserting into the multiview bitstream an indication of a field view component for updating the order of the field view components in a reference picture list.

In one embodiment, the updating a reference picture list comprises using an extended inter-view reference index value space, wherein the extended inter-view reference index value space includes the first field view component and the third field view component having different inter-view reference indices.

In another aspect of the invention, a method comprises receiving a multiview bitstream; generating a reference picture list for the second view component to include at least one of the following: (a) a first field view component based on the first view component or (b) a first complementary field view component pair including the first view component; and decoding the multi-view video stream using the reference picture list.

In another aspect of the invention, an apparatus comprises an encoder configured to encode a first view component of a first view of a multiview bitstream; and encode a second view component of a second view; wherein encoding of the second view component enables generating of a reference picture list for the second view component to include at least one of the following: (a) a first field view component based on the first view component or (b) a first complementary field view component pair including the first view component.

In another aspect of the invention, an apparatus comprises a decoder configured to receive a multiview bitstream; generate a reference picture list for the second view component to include at least one of the following: (a) a first field view component based on the first view component or (b) a first complementary field view component pair including the first view component; and decode the multi-view video stream using the reference picture list.

In another aspect of the invention, an apparatus comprises a processor and a memory unit communicatively connected to the processor. The memory unit includes computer code for encoding a first view component of a first view of a multiview bitstream; and computer code for encoding a second view component of a second view; wherein the encoding of the second view component enables generating of a reference picture list for the second view component to include at least one of the following: (a) a first field view component based on the first view component or (b) a first complementary field view component pair including the first view component;

In another aspect of the invention, an apparatus comprises a processor and a memory unit communicatively connected to the processor. The memory unit includes computer code for receiving a multiview bitstream; computer code for generating a reference picture list for the second view component to include at least one of the following: (a) a first field view component based on the first view component or (b) a first complementary field view component pair including the first view component; and computer code for decoding the multi-view video stream using the reference picture list.

In another aspect of the invention, a computer program product is embodied on a computer-readable medium and comprises computer code for encoding a first view component of a first view of a multiview bitstream; and computer code for encoding a second view component of a second view; wherein the encoding of the second view component enables generating of a reference picture list for the second view component to include at least one of the following: (a) a first field view component based on the first view component or (b) a first complementary field view component pair including the first view component.

In another aspect of the invention, a computer program product is embodied on a computer-readable medium and comprises computer code for receiving a multiview bitstream; computer code for generating a reference picture list for the second view component to include at least one of the following: (a) a first field view component based on the first view component or (b) a first complementary field view component pair including the first view component; and computer code for decoding the multi-view video stream using the reference picture list.

These and other advantages and features of various embodiments of the present invention, together with the organization and manner of operation thereof, will become apparent from the following detailed description when taken in conjunction with the accompanying drawings.

BRIEF DESCRIPTION OF THE DRAWINGS

Embodiments of the invention are described by referring to the attached drawings, in which.

DETAILED DESCRIPTION OF THE VARIOUS EMBODIMENTS

Figure 1:
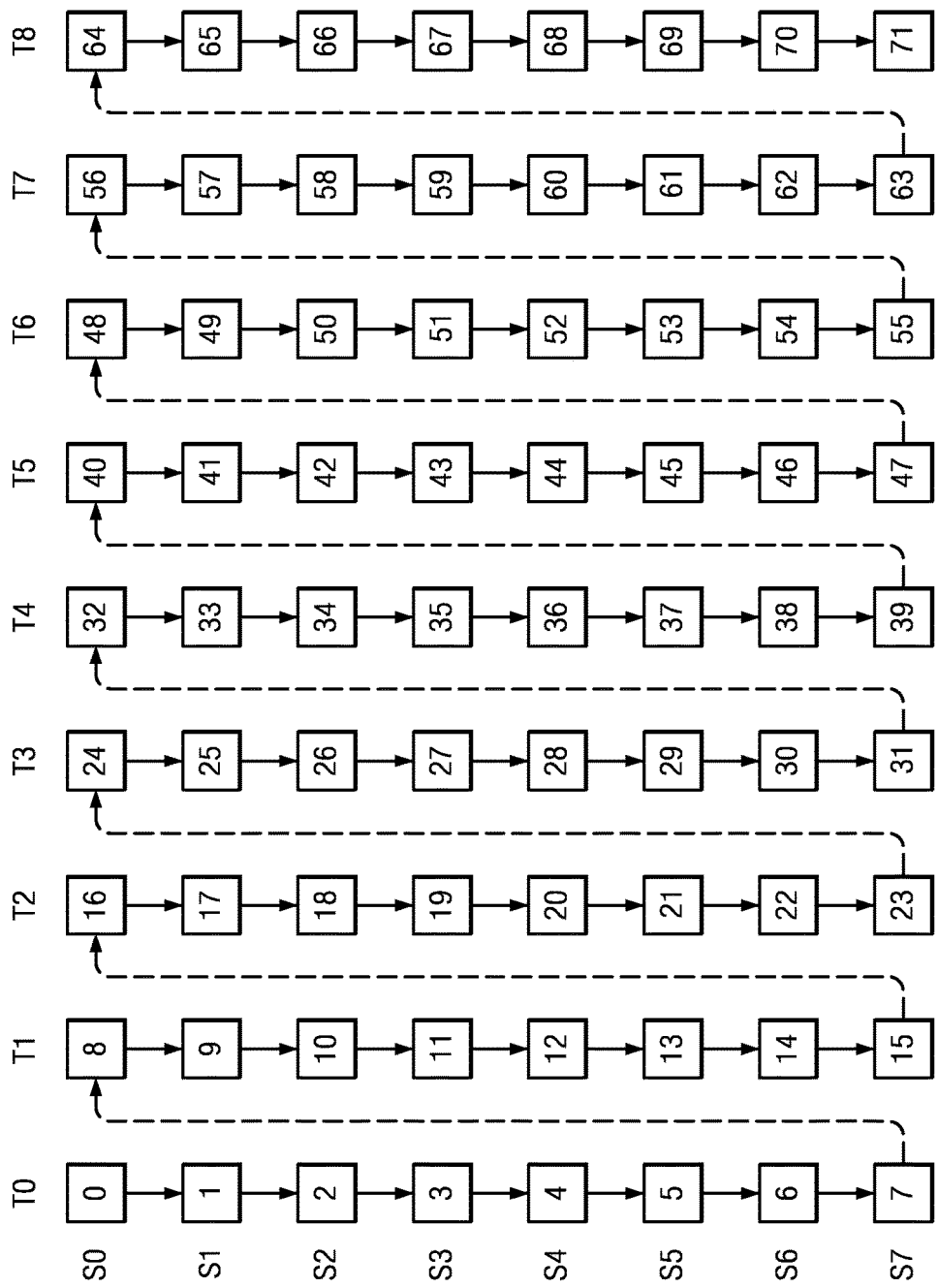
FIG. 1 illustrates an exemplary MVC decoding order.

In the following description, for purposes of explanation and not limitation, details and descriptions are set forth in order to provide a thorough understanding of the present invention. However, it will be apparent to those skilled in the art that the present invention may be practiced in other embodiments that depart from these details and descriptions.

Picture output timing, such as output timestamp, is not included in the integral part of AVC or MVC bitstreams. However, a value of picture order count (POC) is derived for each picture and is non-decreasing with increasing picture position in output order relative to the previous IDR picture or a picture containing a memory management control operation marking all pictures as "unused for reference". POC indicates the output order of pictures. It is also used in the decoding process for implicit scaling of motion vectors in the direct modes of bi-predictive slices, for implicitly derived weights in weighted prediction, and for reference picture list initialization of B slices. Furthermore, POC is used in verification of output order conformance. Values of POC can be coded with one of the three modes signaled in the active sequence parameter set. In the first mode, the selected number of least significant bits of the POC value is included in each slice header. In the second mode, the relative increments of POC as a function of the picture position in decoding order in the coded video sequence are coded in the sequence parameter set. In addition, deviations from the POC value derived from the sequence parameter set may be indicated in slice headers. In the third mode, the value of POC is derived from the decoding order by assuming that the decoding and output order are identical. In addition, only one non-reference picture can occur consecutively, when the third mode is used.

"nal_ref_idc" is a 2-bit syntax element in the Network Abstraction Layer (NAL) unit header. The value of nal_ref_idc indicates the relevance of the NAL unit for reconstruction of sample values. Non-zero values of nal_ref_idc must be used for coded slice and slice data partition NAL units of reference pictures as well as for parameter set NAL units. The value of nal_ref_idc must be equal to 0 for slices and slice data partitions of non-reference pictures and for NAL units that do not affect the reconstruction of sample values, such as supplemental enhancement information NAL units. In the H.264/AVC high-level design, external specifications (i.e., any system or specification using or referring to H.264/AVC) was allowed to specify an interpretation to the non-zero values of nal_ref_idc. For example, the RTP payload format for H.264/AVC, RFC 3984, specified strong recommendations on the use of nal_ref_idc. In other words, some systems have established practices to set and interpret the non-zero nal_ref_idc values. For instance, an RTP mixer might set nal_ref_idc according to the NAL unit type, e.g. nal_ref_idc is set to 3 for IDR NAL units. As MVC is a backward-compatible extension of H.264/AVC, it is desirable that existing H.264/AVC-aware system elements can also handle MVC streams. It is therefore undesirable that the semantics of particular non-zero value of nal_ref_idc would be specified differently in the MVC specification compared to any other non-zero value of nal_ref_idc.

The reference picture lists construction in AVC can be described as follows. When multiple reference pictures can be used, each reference picture must be identified. In AVC, the identification of a reference picture used for a coded block is as follows. First, all of the reference pictures stored in the DPB for prediction reference of future pictures is either marked as "used for short-term reference" (referred to as short-term pictures) or "used for long-term reference" (referred to as long-term pictures). When decoding a coded slice, a reference picture list is constructed. If the coded slice is a bi-predicted slice, a second reference picture list is also constructed. A reference picture used for a coded block is then identified by the index of the used reference picture in the reference picture list. The index is coded in the bitstream when more than one reference picture may be used.

The reference picture list construction process is as follows. For simplicity, it is assumed herein that only one reference picture list is needed. First, an initial reference picture list is constructed including all of the short-term and long-term reference pictures. Reference picture list modification (RPLM) is then performed when the slice header contains RPLM commands. The PRLM process may modify the reference pictures into a different order than the order in the initial list. Both the initial list and the final list, after modification, contains only a certain number of entries indicated by a syntax element in the slice header or the picture parameter set referred by the slice.

During the initialization process, all of the short-term and long-term pictures are considered as candidates of reference picture lists for the current picture. No matter current picture is B or P picture, and long-term pictures are placed after the short-term pictures in RefPicList0 (and RefPicList1 available for B slices). For P pictures, the initial reference picture list for RefPicList0 contains all short-term reference pictures ordered in descending order of PicNum.

For B pictures, those reference pictures obtained from all short term pictures are ordered by a rule related to current POC number and the POC number of the reference picture. For RefPicList0, reference pictures with smaller POC (comparing to current POC) are considered first and inserted into the RefPictList0 with the descending order of POC. Pictures with larger POC are then appended with the ascending order of POC. For RefPicList1 (if available), reference pictures with larger POC (comparing to current POC) are considered first and inserted into the RefPicList1 with the ascending order of POC. Pictures with smaller POC are then appended with descending order of POC. After considering all of the short-term reference pictures, the long-term reference pictures are appended by the ascending order of LongTermPicNum, both for P and B pictures.

The modification process is invoked by continuous RPLM commands, including four type of commands: (1) A command to specify a short-term picture with smaller PicNum (comparing to a temporally predicted PicNum) to be moved; (2) a command to specify a short-term picture with larger PicNum to be moved; (3) a command to specify a long-term picture with a certain LongTermPicNum to be moved and (4) a command to specify the end of the RPLM loop. If a current picture is bi-predicted, there can be two loops—one for the forward reference list and one for the backward reference list.

The predicted PicNum referred to as picNumLXPred is initialized as the PicNum of the current coded picture and is set to the PicNum of the just moved picture after each modification process for a short-term picture. The difference between the PicNum of a current picture being modified and picNumLXPred is signaled in the RPLM command. The picture indicated to be modified is moved to the beginning of the reference picture list. After the modification process is complete, a whole reference picture list is truncated based on the active reference picture list size, which is num_ref_idx_1X_active_minus1+1 (X equal to 0 or 1 corresponds for RefPicList0 and RefPicList1 respectively).

Each short-term picture is associated with a variable PicNum that is derived from the syntax element frame_num, and each long-term picture is associated with a variable LongTermPicNum that is derived form the long_term_frame_idx which is signaled by MMCO command.

PicNum is derived from FrameNumWrap depending on whether frame or field is coded or decoded. For frames where PicNum equal to FrameNumWrap. FrameNumWrap is derived from FrameNum, and FrameNum is derived from frame_num. For example, in AVC frame coding, FrameNum is assigned the same as frame_num and FrameNumWrap is defined as below:

```
if( FrameNum > frame_num )
    FrameNumWrap = FrameNum − MaxFrameNum
else
    FrameNumWrap = FrameNum
```

LongTermPicNum is derived from the long-term frame index (LongTermFrameIdx) assigned for the picture. For frames, LongTermPicNum is equal to LongTermFrameIdx.

"frame_num" is a syntax element in each slice header. The value of frame_num for a frame or a complementary field pair essentially increments by one, in modulo arithmetic, relative to the frame_num of the previous reference frame or reference complementary field pair. In IDR pictures, the value of frame_num is zero. For pictures containing a memory management control operation marking all pictures as "unused for reference," the value of frame_num is considered to be zero after the decoding of the picture.

The input signal to an encoder can be interlaced or progressive. When the signal is progressive, each line of the sampling array is represented in an uncompressed frame. When the signal is interlaced, every other line of the sampling array is represented in an uncompressed field. A top field is such that it contains the top-most line of the sampling array, and a bottom is such that it contains the second top-most line of the sampling array. The sampling times of consecutive uncompressed fields are usually different.

An encoder usually codes an uncompressed frame into a coded frame, but an uncompressed frame can also be coded as two coded fields of opposite parity, referred to as a (coded) complementary field pair. In this case, the output times and the picture order counts of both the fields of a complementary field pair are usually respectively the same. An encoder usually codes an uncompressed field into a coded field. However, an encoder can also code two opposite-parity and consecutive uncompressed fields, in decoding and output order, as a coded frame. In this case, a coded frame usually contains unequal picture order count values and output times for the top and bottom fields of the frame.

A decoder may output a decoded complementary field pair as a decoded frame, if the output times of both the fields are the same. A decoder should output a decoded frame as two decoded fields, if the output times of the fields contained in the coded frame differ.

A picture in H.264/AVC is a collective term of a frame or a field. A decoded frame is considered to contain a top field and a bottom field.

In H.264/AVC, for the decoding process of a coded field, the pictures in the reference picture lists are decoded fields. It is noted that both fields of a decoded frame are included in the reference picture lists for the decoding process of a coded field.

During the reference picture list initialization process, not only the fields of the decoded pictures (that have nal_ref_idc greater than 0) with the same parity (top or bottom), but also those with opposite parity can be added in the reference picture list(s). Also, a field can use the field in the same reference complementary field pair but with opposite parity as a reference, e.g., after the top field has been coded, when coding the bottom field, the top field could be inserted into the initialized reference picture list(s).

When reference picture list modification is invoked for a coded frame, PicNum derived for a frame is modified as follows: PicNum=PicNum*2+p; p is equal to 1 when the parity of current reference field is the same as the field that is being decoded, and is 0, otherwise.

In multi-view video coding, video sequences output from different cameras, each corresponding to different views, are encoded into one bit-stream. After decoding, to display a certain view, the decoded pictures belong to that view are reconstructed and displayed. It is also possible that more than one view is reconstructed and displayed.

Multi-view video coding has a wide variety of applications, including free-viewpoint video/television, 3D TV and surveillance. Currently, the Joint Video Team (JVT) of ISO/IEC Motion Picture Expert Group (MPEG) and ITU-T Video Coding Expert Group is working to develop a MVC standard, which is becoming an extension of H.264/AVC. Hereafter, we refer to these two draft standards as MVC and AVC, respectively.

The latest draft of MVC is in described in JVT-AB209, "Joint Draft 8.0 on Multiview Video Coding", 28.sup.th JVT meeting, Hannover, Germany, July 2008.

MVC is AVC compliant and there is one base view which can be decoded by an H.264/AVC decoder and the other views are called non-base views.

Referring now to FIG. 1, an exemplary MVC decoding order (i.e. bitstream order) is illustrated. The decoding order arrangement is referred as time-first coding. Each access unit is defined to contain the coded pictures of all the views for one output time instance. Note that the decoding order of access units may not be identical to the output or display order.

Figure 2A:
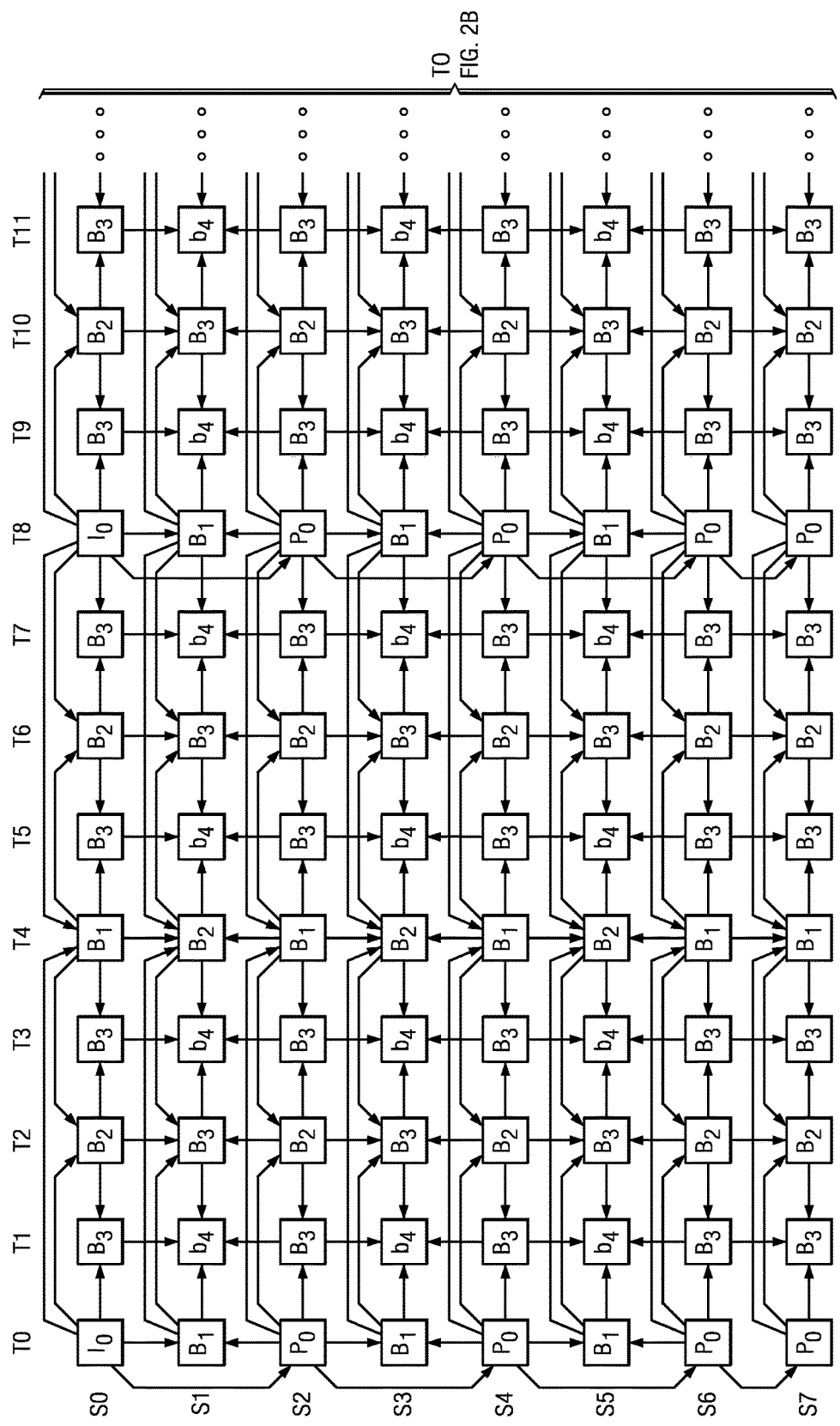
FIGS. 2a and 2b illustrate an exemplary MVC prediction structure for multi-view video coding.
Figure 2B:
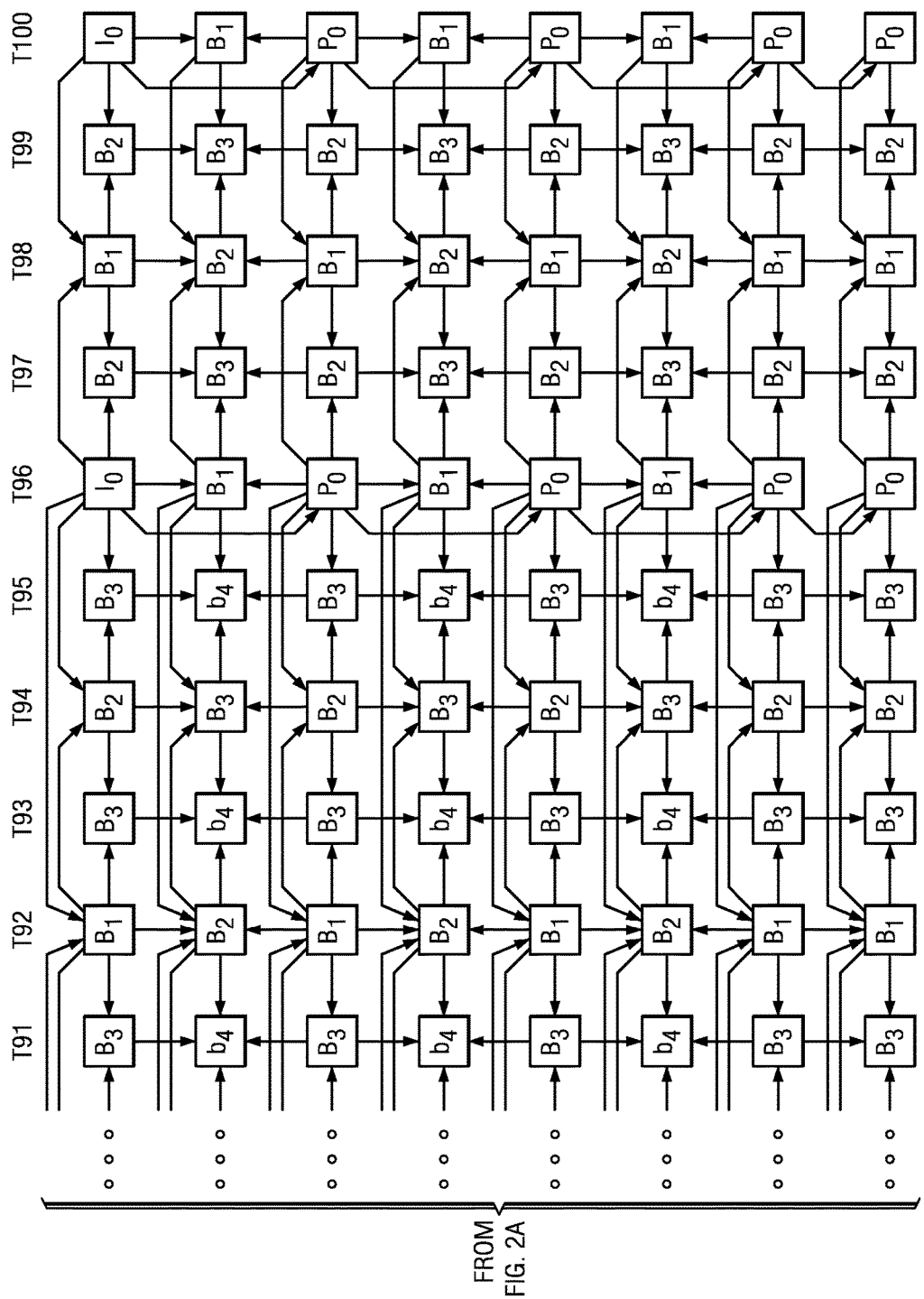

Referring now to FIGS. 2a and 2b, an exemplary MVC prediction (including both inter-picture prediction within each view and inter-view prediction) structure for multi-view coding is illustrated. In the illustrated structure, predictions are indicated by arrows, the pointed-to-object using the point-from object for prediction reference.

An anchor picture is a coded picture in which all slices reference only slices with the same temporal index, i.e., only slices in other views and not slices in earlier pictures of the current view. An anchor picture is signaled by setting the "anchor_pic_flag" to 1. After decoding the anchor picture, all following coded pictures in display order shall be able to be decoded without inter-prediction from any picture decoded prior to the anchor picture. If a picture in one view is an anchor picture, then all pictures with the same temporal index in other views shall also be anchor pictures. Consequently, decoding of any view can be started from a temporal index that corresponds to anchor pictures. Pictures with "anchor_pic_flag" equal to 0 are named non-anchor pictures.

In MVC Joint Draft (JD) 8.0, view dependencies are specified in the sequence parameter set (SPS) MVC extension. The dependencies for anchor pictures and non-anchor pictures are independently specified. Therefore, anchor pictures and non-anchor pictures can have different view dependencies. However, for the set of pictures that refer to the same SPS, all the anchor pictures must have the same view dependency, and all the non-anchor pictures must have the same view dependency. In the SPS MVC extension, dependent views can be signaled separately for the views used as reference pictures in RefPicList0 and RefPicList1.

Inter-view reference index is an index into a list of views for inter-view prediction in an initialized reference picture list in decoding all the anchor view components or all the non-anchor view components of any particular view as specified in the sequence parameter set MVC extension.

In JD 8.0, there is an "inter_view_flag" in the network abstraction layer (NAL) unit header which indicates whether the current picture is used for inter-view prediction for the pictures in other views.

The process of constructing reference picture lists in MVC is summarized as follows.

First, a reference picture list is constructed including all the short-term and long-term reference pictures that are marked as "used for reference" and belong to the same view as the current slice. Those short-term and long-term reference pictures are named intra-view references for simplicity. Then, inter-view reference pictures are appended after the intra-view references, according to the SPS and the "inter_view_flag" to form an initial list. Reference picture list modification (RPLM) is then performed when the slice header contains RPLM commands. The RPLM process may reorder the intra-view and inter-view reference pictures into a different order than the order in the initial list. Both the initial list and final list after modification (reordering) must contain only a certain number of entries indicated by a syntax element in the slice header or the picture parameter set referred by the slice.

The syntax for the reference picture modification is as follows:

| ref_pic_list_modification( ){ | C | Descriptor |
|---|---|---|
|   if( slice_type % 5 != 2 && slice_type != 4 ){ | | |
|     ref_pic_list_modification_flag_l0 | 2 | u(l) |
|     if( ref_pic_list_modification_flag_l0 ) | | |
|       do { | | |
|         modification_of_pic_nums_idc | 2 | ue(v) |

-continued

```
            if( modification_of_pic_nums_idc == 0 ||
                modification_of_pic_nums_idc == 1 )
                abs_diff_pic_num_minus1                          2  ue(v)
            else if( modification_of_pic_nums_idc == 2 )
                long_term_pic_num                                2  ue(v)
            else if ( modification_of_pic_nums_idc == 4 ||
                      modification_of_pic_nums_idc == 5 )
                abs_diff_view_idx_minus1                         2  ue(v)
        } while( modification_of_pic_nums_idc != 3 )
    }
    if( slice_type % 5 == 1 ){
        ref_pic_list_modification_flag_l1                        2  u(1)
        if( ref_pic_list_modification_flag_l1 )
            do {
                modification_of_pic_nums_idc                     2  ue(v)
                if( modification_of_pic_nums_idc == 0 ||
                    modification_of_pic_nums_idc == 1 )
                    abs_diff_pic_num_minus1                      2  ue(v)
                else if( modification_of_pic_nums_idc == 2 )
                    long_term_pic_num                            2  ue(v)
                else if ( modification_of_pic_nums_idc == 4 ||
                          modification_of_pic_nums_idc == 5 )
                    abs_diff_view_idx_minus1                     2  ue(v)
            } while( modification_of_pic_nums_idc != 3 )
    }
}
```

| modification_of_pic_nums_idc | Modification specified |
| --- | --- |
| 0 | abs_diff_pic_num_minus1 is present and corresponds to a difference to subtract from a picture number prediction value |
| 1 | abs_diff_pic_num_minus1 is present and corresponds to a difference to add to a picture number prediction value |
| 2 | long_term_pic_num is present and specifies the long-term picture number for a reference picture |
| 3 | End loop for modification of the initial reference picture list |
| 4 | abs_diff_view_idx_minus1 is present and corresponds to a difference to subtract from a prediction value of the inter-view reference index |
| 5 | abs_diff_view_idx_minus1 is present and corresponds to a difference to add to a prediction value of the inter-view reference index |

As shown in the above syntax tables, in the modified RPLM syntax table, the modification_of_pic_nums_idc syntax element can be two more values, 4 and 5, corresponding to the modification commands for the inter-view reference pictures. In other words, compared with H.264/AVC, the modification process is invoked by continuous RPLM commands, including six types of commands. For the type 1) to type 3) commands, they are applied as defined in H.264/AVC, but only for the reference pictures in the same view as the current picture being decoded. The two new types of commands, type 5) and type 6) are explained as follows.

The predicted inter-view reference index referred to as picViewIdxLXPred is initialized as the 0 and is set to picViewIdxLX (inter-view reference index) of the just moved picture after each modification process for an inter-view reference picture. The difference between the picViewIdxLX of a current picture being modified and picNumLXPred is signaled in the RPLM command. The picture indicated to be modified is moved to the beginning of the reference picture list. After the modification process is complete, a whole reference picture list is truncated based on the active reference picture list size, which is num_ref_idx_1X_active_minus1+1 (X equal to 0 or 1 corresponds for RefPicList0 and RefPicList1 respectively).

Detailed derivation process of the picViewIdxLX is described as follows:

```
If modification_of_pic_nums_idc is equal to 4,
    if( picViewIdxLXPred - ( abs_diff_view_idx_minus1 + 1 ) < 0 )
    picViewIdxLX = picViewIdxLXPred -
       ( abs_diff_view_idx_minus1 + 1 ) + maxViewIdx
    else
    picViewIdxLX = picViewIdxLXPred -
       ( abs_diff_view_idx_minus1 + 1 )
Otherwise (modification_of_pic_nums_idc is equal to 5),
    if( picViewIdxLXPred + ( abs_diff_view_idx_minus1 + 1 ) >=
        MaxViewIdx )
    picViewIdxLX = picViewIdxLXPred +
       ( abs_diff_view_idx_minus1 + 1 ) - maxViewIdx
    else
    picViewIdxLX = picViewIdxLXPred +
       ( abs_diff_view_idx_minus1 + 1 )
where maxViewIdx is derived as follows (currVOIdx is VOIdx of
the current slice):
    If the current slice has anchor_pic_flag equal to 1, maxViewIdx is
    set equal to num_anchor_refs_IX[ currVOIdx ].
        Otherwise (the current slice has anchor_pic_flag equal to 0),
    maxViewIdx is set equal to
    num_non_anchor_refs_IX[ currVOIdx ].
```

After picViewIdxLX is modified, the following procedure is conducted to find the inter-view prediction reference with inter-view reference index equal to picViewIdxLX.

If the current slice has anchor_pic_flag equal to 1,
  targetViewID=anchor_refs_1X[currVOIdx]
  [picViewIdxLX]

Otherwise (the current slice has anchor_pic_flag equal to 0), targetViewID=non_anchor_refs_1X[currVOIdx][picViewIdxLX]

In the current MVC specification, only one profile, namely multiview high profile is supported. In this profile, the base view is compliant to AVC high profile and the non-base views only have those tools that defined in AVC high profile and inter-view prediction. Also, this profile does not support interlace coding and only supports the coding of progressive contents.

Figure 3:
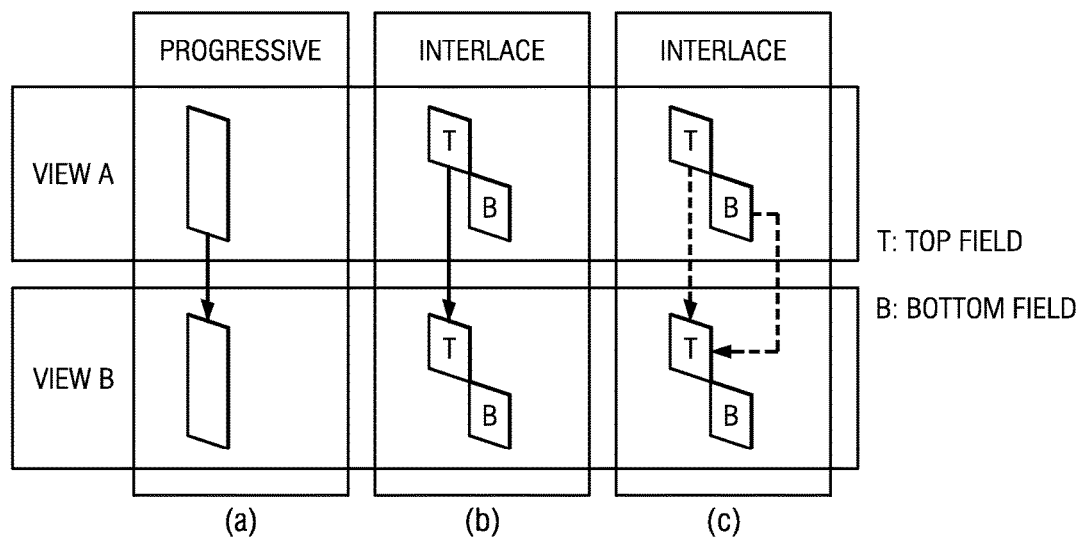
FIGS. 3(a)-(c) illustrate exemplary inter-view prediction in progressive coding.

Referring now to FIGS. 3(a)-(c), an example of inter-view prediction in progressive coding is illustrated in FIG. 3(a), wherein view B is coded with inter-view prediction from view A. In this case, a view component in view B uses the corresponding view component in view A as inter-view prediction reference.

Embodiments of the present invention relate to the use of interlace content in multiview applications. In accordance with embodiments of the present invention, the MVC specification can be extended to support field coding when view components represent fields and are correspondingly referred to as field view components. Considering the field view components within a view and within the same coded video sequence and starting from the first field view component in decoding order, two consecutive and opposite-parity field view components, in decoding and output order, belong to a complementary field view component pair provided that neither of them belongs to other complementary field view component pairs. A view component which is progressively coded is a frame view component. The reference picture list construction processes specified in the current MVC WD could be directly applied for reference field view components, but they lack the ability to address different field view components of a complementary field view component pair. Consequently, a field in view B can only use one of the two fields in the corresponding view component in view A, either the field with the same parity or the field with the opposite parity, as inter-view prediction reference. The selection of one of the two fields is non-adaptive. Thus, an encoder cannot indicate it to the decoder in the bitstream, but rather the selection has to be determined in the specification. An example of inter-view prediction between field view components of the same parity is shown in FIG. 3(b).

Allowing only one field view component (with the same or opposite parity) to be used as inter-view prediction reference in a non-adaptive manner is not efficient from coding efficiency point of view. Therefore, a mechanism is needed to enable the use of either or both of the two field view components of a complementary field view component pair as inter-view prediction reference for coding of a field view component of another view. One example of such an inter-view prediction scheme is illustrated in FIG. 3(c).

Figure 4:
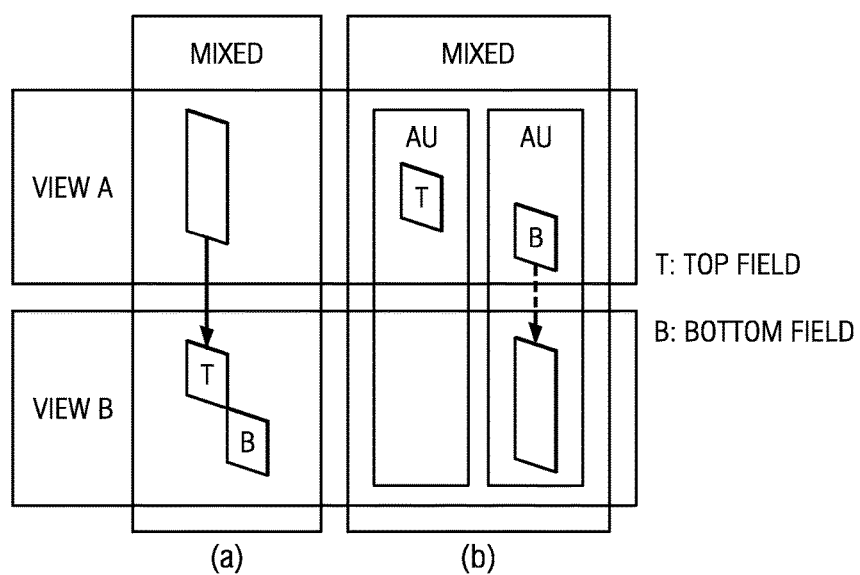
FIG. 4(a)-(b) illustrate exemplary mixed interlace and progressive conding.

Referring now to FIGS. 4(a)-(b), an example of mixed interlace and progressive coding are illustrated. In FIG. 4(a), the uncompressed frame view component in view A, which may be the base view, is coded as a frame view component, while the uncompressed frame view component in view B is coded as a complementary field view component pair. In FIG. 4(b), the uncompressed frame view component in view A, which may be the base view, is coded as field view components, while the uncompressed frame view component in view B is coded as a frame view component. In both cases, there lacks a mechanism to enable inter-view prediction between a frame view component and a field view component. It is noted that in the previous example, an encoder can process an uncompressed field view component pair similarly as an uncompressed frame view component.

In accordance with embodiments of the present invention, a multi-view video coding structure and a mechanism enable efficient inter-view prediction between field view components regardless of their parity and between field view component and frame view component. In this regard, a reference picture list initialization process and a reference picture list modification process are provided.

In the following descriptions, the term "view component" is used to collectively refer to a frame view component or a field view component, and the concept of the time instance is defined as follows.

Within a particular view, coded frame view components and coded field view components are grouped to belong to different time instances as follows. Each coded frame view component itself belongs to one time instance, and no other view component within the same view belongs to the same time instance. For coded field view components within the particular view, each complementary field view component pair belongs to one time instance, and no other view component besides the complementary field view component pair belongs to the same time instance. Each un-paired field view component within the particular view belongs to one time instance of itself, and no other view component within the view belongs to the same time instance. It is noted that the output times of the two field view components of the same view and the same time instance need not to be the same.

Whether two view components from different views belong to the same time instance is specified as follows. If a view component A of one view has only one output time, and the output time is the same as the only output time of another view component B of another view, then view components A and B belong to the same time instance. If a frame view component C of one view has two output times and one of the two output times is equal to an output time of another view component D of another view, then the frame view component C belongs to the same time instance as the view component D. Note that view component D could have one or two output times.

Figure 5:
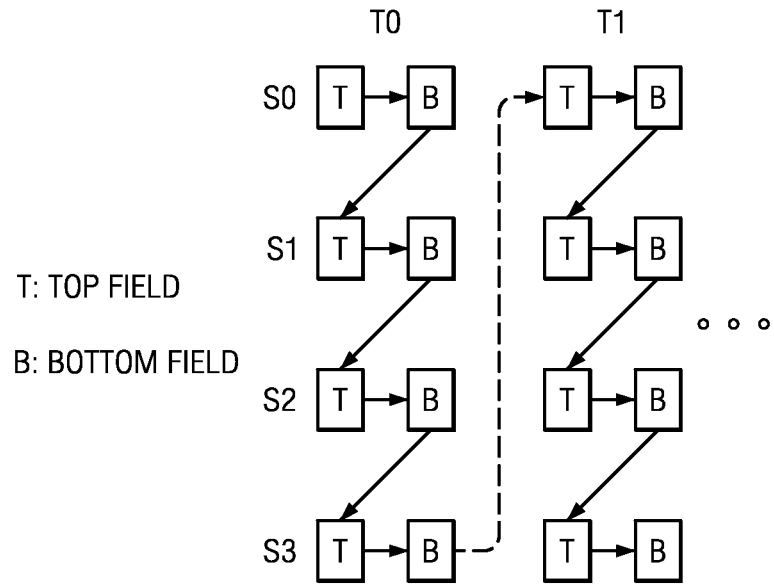
FIG. 5 illustrates an exemplary time-first coding with continuous fields of a complementary field pair.

For consecutively coded complementary field view component pairs in a time instance (referred to below as "Case 1"), all the view components in a time instance are field view components and the two field components of a complementary field view component pair (within one view) are consecutive in decoding order (also referred to as bitstream order). Thus, no view component from other views appears between the two field components of a complementary field view component pair. An example of this case is shown in FIG. 5. In one time instance, the complementary field view component pairs of different views are coded one after another.

In this embodiment, an access unit is typically considered to contain both field components of a complementary field view component pair for all views. It is noted that such an access unit definition makes the base view incompatible with H.264/AVC.

The reference picture list initialization process puts both the top field view components and the bottom field view components of the inter-view reference view components into the initial reference picture list or lists when a field view component is decoded. For simplicity, we still use the terminology "inter-view reference picture" to indicate an "inter-view reference view component" and "field" to indicate "field view component".

Reference picture list construction includes an initialization process and a reference picture list modification process. For the initialization process of the reference picture list, the sub-process that appends inter-view prediction references is modified as follows.

In the ascending order of inter-view reference index, an inter-view reference picture is identified and the following applies:

Append the field (of the inter-view reference picture), which is with identical parity as the field being decoded, to the reference picture list;

Append the field (of the inter-view reference picture), which is with opposite parity as the field being decoded, to the reference picture list.

In one embodiment of the reference picture list modification process, a new flag is added in the reference picture list modification syntax table only when the modification_of_pic_nums_idc syntax element is equal to 4 or 5. This flag specifies whether the indicated field being inserted to the reference picture list is with the same parity as the field being decoded or not.

In another embodiment of the reference picture list modification process, a new decoding process (a specified later) is proposed to indentify a field by using the existing reference picture list modification syntax elements.

For consecutively coded field view components of the same parity in a time instance (referred to below as "Case 2"), all the view components in a time instance are field view components, and for one time instance all the top fields are consecutively coded and they are followed with all the consecutively coded bottom fields. In one embodiment, the top and bottom fields within a time instance may be in opposite order.

Figure 6:
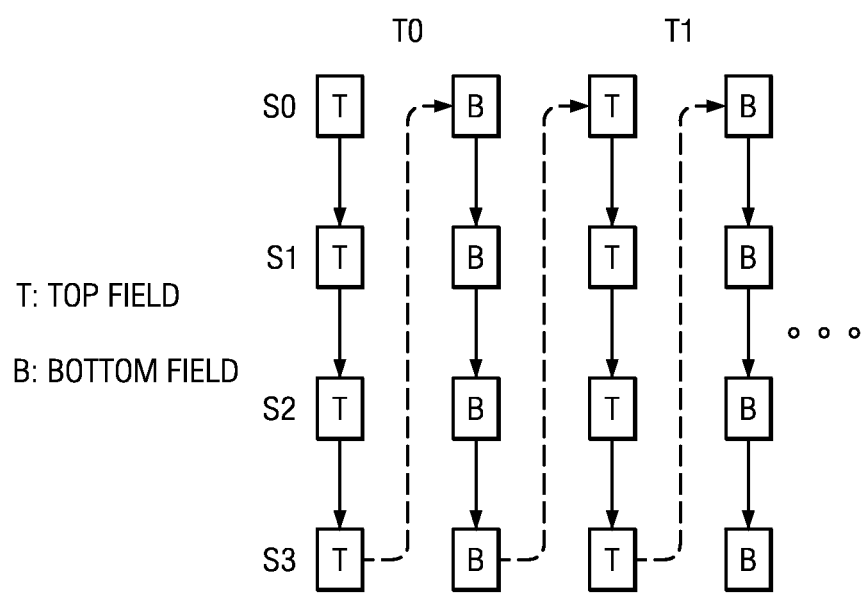
FIG. 6 illustrates an exemplary time-first coding with continuous fields of the same parity.

An example of this case is illustrated in FIG. 6. In one time instance, top fields of different views are first coded in the view order, then the bottom fields of the different views are coded. In this embodiment, an access unit is typically considered to contain the field components of a single parity for all views of a time instance. In other words, all top fields in one time instance form an access unit, and all bottom fields in one time instance form another access unit. Such an access unit definition makes the base view compatible with H.264/AVC.

The reference picture list initialization process puts both the top fields and the bottom fields of the inter-view reference fields into the initial reference picture list or lists when a field view component is decoded. However, the difference between reference picture list initialization process here and the process in case 1 is that some of the bottom fields of inter-view prediction picture might not be available (e.g., have not been decoded) and thus are not inserted in the reference picture list. When coding a top field of one view component in one time instance, all the bottom fields of the time instance cannot be used as inter-view prediction references, and when coding a bottom field, the top fields and the bottom fields of the directly dependent views could be used as inter-view prediction references. For example, if the views are coded in the order as illustrated in FIG. 5, then, when coding the top field of view 1, only the top field of view 0 can be used as inter-view prediction reference. However, when coding the bottom field of view 1, both the top field and the bottom field of view 0 can be used as inter-view prediction references.

Similarly, the reference picture list modification processes can be the same as those for Case 1. However, the syntax (commands) shall be generated in a way to prevent the decoder from using any bottom field of the same time instance to be used as inter-view reference, when a top field is coded.

Note that in both Case 1 and Case 2, no inter-view prediction can be performed between fields across different time instances.

An example of a case with mixed coding with progressive basis view in a time instance is illustrated in FIG. 4(a). Note that a basis view here refers to the view for which the view component may be used for inter-view prediction reference. In this case, an access unit is defined to include the coded field view component pair or the coded frame view component for each view of a time instance. It is noted that such an access unit definition makes the base view compatible with H.264/AVC.

The coding order of this case is similar to Case 1, that is, the two field view components of a complementary field view component pair are consecutive in the bitstream, coding and decoding order.

The reference picture list initialization and reference picture list modification for the field view components are the same as those processes defined for case 1. When a frame view component is used as inter-view prediction for a field view component, it is temporarily considered as a complementary field view component pair.

An example of a case with mixed coding with interlace basis view in a time instance is illustrated in FIG. 4(b). In this case, there are also two access units for one time instance. The first access unit contains the top field view components. The second access unit contains the bottom field view components and the frame view components. Note that when there are coded frame view components and coded field view components in the second access unit, they are ordered in the ascending order of the view order index.

When the first access unit of a time instance is coded, since they are only top fields in the same access unit, the reference picture list initialisation and reference picture list modification processes use only the top fields belonging to the direct dependent view of the current coding picture as inter-view references.

When the second access unit of a time instance is coded, the following applies. If a field view component is required for prediction of a frame field component, the complementary field view component pair is temporarily considered as a frame. When coding a bottom field view component of the second access unit of the time instance and it uses a frame view component as a reference, that frame view component is temporarily considered as a complementary field view component pair and both of the field view components can be used during the reference picture list initialization process and the reference picture list modification process. For implementation of an embodiment of the present invention, the reference picture list modification syntax may be as follows:

| ref_pic_list_modification( ){ | | C | Descriptor |
|---|---|---|---|
| if( slice_type % 5 != 2 && slice_type != 4 ){ | | | |
| ref_pic_list_modification_flag_l0 | | 2 | u(l) |

| ref_pic_list_modification( ){ | C | Descriptor |
|---|---|---|
|   if( ref_pic_list_modification_flag_l0 ) | | |
|     do { | | |
|       modification_of_pic_nums_idc | 2 | ue(v) |
|       if( modification_of_pic_nums_idc == 0 \|\| | | |
|         modification_of_pic_nums_idc == 1 ) | | |
|         abs_diff_pic_num_minus1 | 2 | ue(v) |
|       else if( modification_of_pic_nums_idc == 2 ) | | |
|         long_term_pic_num | 2 | ue(v) |
|       else if ( modification_of_pic_nums_idc == 4 \|\| | | |
|           modification_of_pic_nums_idc == 5 ){ | | |
|         abs_diff_view_idx_minus1 | 2 | ue(v) |
|         if ( field_pic_flag ) | | |
|           parity_flag | 2 | u(1) |
|       } | | |
|     } while( modification_of_pic_nums_idc != 3 ) | | |
|   } | | |
|   if( slice_type % 5 == 1 ){ | | |
|     ref_pic_list_modification_flag_l1 | 2 | u(1) |
|     if( ref_pic_list_modification_flag_l1 ) | | |
|       do { | | |
|         modification_of_pic_nums_idc | 2 | ue(v) |
|         if( modification_of_pic_nums_idc == 0 \|\| | | |
|           modification_of_pic_nums_idc == 1 ) | | |
|           abs_diff_pic_num_minus1 | 2 | ue(v) |
|         else if( modification_of_pic_nums_idc == 2 ) | | |
|           long_term_pic_num | 2 | ue(v) |
|         else if ( modification_of_pic_nums_idc == 4 \|\| | | |
|             modification_of_pic_nums_idc == 5 ){ | | |
|           abs_diff_view_idx_minus1 | 2 | ue(v) |
|           if ( field_pic_flag ) | | |
|             parity_flag | 2 | u(1) |
|         } | | |
|       } while( modification_of_pic_nums_idc != 3 ) | | |
|   } | | |
| } | | |

Further, the reference picture list modification semantics may be as follows:

parity_flag equal to 1 specifies that the field being modified is the field with the same parity of the picture being decoded. This value equal to 0 specifies that the field being modified is the field with opposite parity of the picture being decoded.

In accordance with embodiments of the present invention, the decoding process may be modified. Modification process of H.8.2.2.3 of the MVC specification for reference picture lists for inter-view prediction references may be modified as follows.

Change the following:

Note that if there is an un-paired field view component, the reference picture list construction process for a un-paired field view component can be the same as a field view component in a complementary field view component pair. When being considered as a reference, un-paired field component can also be indentified by the syntax and process defined above.

In another embodiment, decoding processes may require no syntax element change. One embodiment of Case 2 is described here. Instead of modifying the MVC reference picture list modification syntax, and using one flag to indicate whether the field with the same or opposite disparity in another view is used as inter-view prediction reference,

```
for( cIdx = num_ref_idx_lX_active_minus1 + 1; cIdx > refIdxLX; cIdx-- )
      RefPicListX[ cIdx ] = RefPicListX[ cIdx - 1]
RefPicListX[ refIdxLX++ ] = inter-view prediction reference with view_id equal to
targetViewID
``` to

```
for( cIdx = num_ref_idx_lX_active_minus1 + 1; cIdx > refIdxLX; cIdx-- )
      RefPicListX[ cIdx ] = RefPicListX[ cIdx - 1]
   if ( !field_pic_flag )
         RefPicListX[ refIdxLX++ ] = inter-view prediction reference with view_id
equal to targetViewID
    else
    {
      if ( parity_flag==1 )
          RefPicListX[ refIdxLX++ ] = inter-view prediction reference with view_id
equal to targetViewID and the reference field has the same parity of the current field
      else
          RefPicListX[ refIdxLX++ ] = inter-view prediction reference with view_id
equal to targetViewID and the reference field has the opposite parity of the current field
    }
``` the value space of inter-view reference indices is doubled, such that two fields of a same frame can have different inter-view reference indices. This enables that for any field being coded, each of all fields that may be used as inter-view prediction references, as defined by the MVC view dependency, has a unique inter-view reference index. When this new inter-view reference indexing is applied in the reference picture list modification process without modifying the MVC reference picture list modification syntax, both or either of the two fields of a frame can be included in the final reference picture list when coding a field of a frame from another view, thus can be either or both used as inter-view prediction reference. One detailed implementation of this embodiment in terms of changes to the MVC specification is provided in below.

The following should be added to the end of "8.2.4.1 Decoding process for picture numbers":

---

To each inter-view reference picture a variable InterViewRefIndex is assigned.
The values of these variables depend on the value of field_pic_flag and bottom_field_flag for the current picture and they are set as follows.
   If field_pic_flag is equal to 0, the following applies.
      InterViewRefIndex is set to the inter-view reference index of the picture
   Otherwise (field_pic_flag is equal to 1), the following applies.
      If the reference field has the same parity as the current field
         InterViewRefIndex = interviewreferenceindex (current field)*2+1
      Otherwise (the reference field has the same parity as the current field)
         InterViewRefIndex = interviewreferenceindex (current field)*2
wherein interviewreferenceindex (current field) returns the inter-view reference index of the current picture.

---

The following modifications should be made to "H.8.2.2.3 Modification process for reference picture lists for inter-view prediction references":

Change the following:

---

If the current slice has anchor_pic_flag equal to 1,
   targetViewID = anchor_refs_lX[ currVOIdx ][ picViewIdxLX ]
Otherwise (the current slice has anchor_pic_flag equal to 0),
   targetViewID = non_anchor_refs_lX[ currVOIdx ][ picViewIdxLX ]
to
if (field_pic_flag)
{
SameParity= picViewIdxLX%2;
picViewIdxLX = picViewIdxLX /2;
}
   If the current slice has anchor_pic_flag equal to 1,
   targetViewID = anchor_refs_lX[ currVOIdx ][ picViewIdxLX ]
   Otherwise (the current slice has anchor_pic_flag equal to 0),
   targetViewID = non_anchor_refs_lX[ currVOIdx ][ picViewIdxLX ]

Note:
picViewIdxLX is the value for the InterViewRefIndex. w

---

Change the following

---

```
for( cIdx = num_ref_idx_lX_active_minus1 + 1; cIdx > refIdxLX; cIdx-- )
       RefPicListX[ cIdx ] = RefPicListX[ cIdx - 1]
RefPicListX[ refIdxLX++ ] = inter-view prediction reference with view_id equal to
targetViewID
to
for( cIdx = num_ref_idx_lX_active_minus1 + 1; cIdx > refIdxLX; cIdx-- )
       RefPicListX[ cIdx ] = RefPicListX[ cIdx - 1]
    if ( !field_pic_flag )
           RefPicListX[ refIdxLX++ ] = inter-view prediction reference with view_id equal
           to targetViewID
    else
    {
       if (SameParity ==1 )
           RefPicListX[ refIdxLX++ ] = inter-view prediction reference with view_id equal
           to targetViewID and the reference field has the same parity of the current field
       else
           RefPicListX[ refIdxLX++ ] = inter-view prediction reference with view_id equal
           to targetViewID and the reference field has the opposite parity of the current
           field
    }
```

---

After the following:

--- where maxViewIdx is derived as follows (currVOIdx is VOIdx of the current slice):
   If the current slice has anchor_pic_flag equal to 1, maxViewIdx is set equal to num_anchor_refs_lX[ currVOIdx ].
   Otherwise (the current slice has anchor_pic_flag equal to 0),
   maxViewIdx is set equal to num_non_anchor_refs_lX[ currVOIdx ].
add the following:
   if ( field_pic_flag )
      maxViewIdx = maxViewIdx *2;

---

Note that if there is an un-paired field view component, the reference picture list construction process for a un-paired field view component can be the same as a field view component in a complementary field view component pair. When being considered as a reference, un-paired field component can also be indentified by the process defined above.

In another aspect, the invention relates to mixed frame and field coding. In this regard, H.264/AVC enables the usage of frame coding for interlaced material. A different picture order count value can be indicated for the top and bottom fields of a coded frame. In addition, macroblock adaptive frame/field (MBAFF) coding may be used in which some macroblocks may be decoded as frame macroblocks and others may be decoded as field macroblocks. A coded frame can be inter-predicted from a complementary reference field pair or a reference frame. A coded field can be inter-predicted from a reference field, regardless whether that reference field was decoded from a coded field or a coded frame. An access unit contains one primary coded picture. Consequently, two H.264/AVC primary coded fields do not belong to the same access unit.

In accordance with certain embodiments of the present invention, a coded frame can be inter-view predicted from a complementary reference field pair.

In accordance with embodiments of the present invention, inter-view complementary reference field pairs are added into the initial reference picture lists when a frame is encoded or decoded. For the initialization process of the reference picture list(s), the sub-process that appends inter-view prediction references is modified as follows. In the ascending order of inter-view reference index, an inter-view reference frame or an inter-view complementary reference field pair is identified and appended to the reference picture list.

Further, in accordance with embodiments of the present invention, inter-view reference fields that resulted from decoding a coded frame may be added into the initial reference picture lists when a field is coded or decoded. The processing of these reference fields is the same as described in the previous sections.

Figure 7:
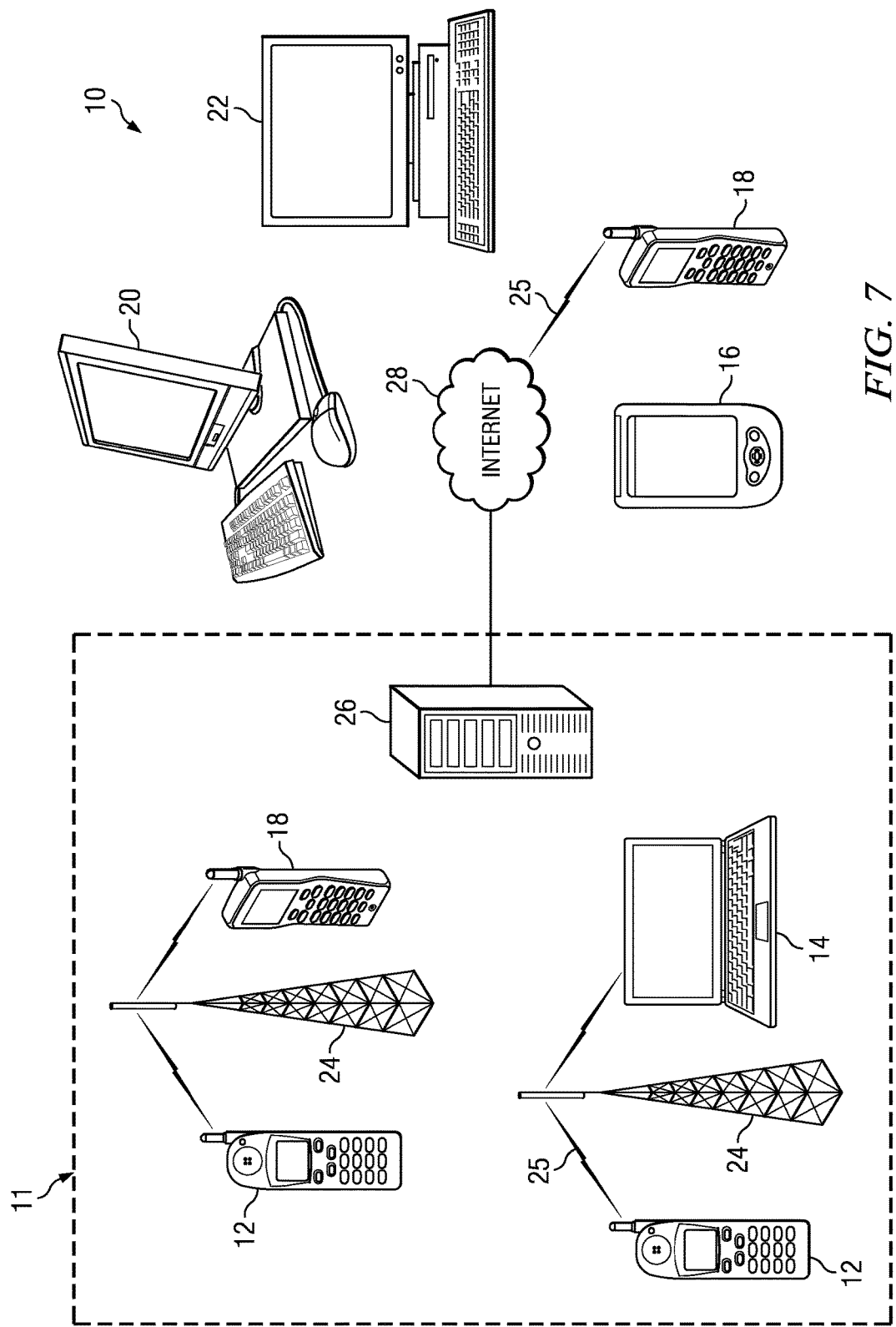
FIG. 7 is an overview diagram of a system within which various embodiments of the present invention may be implemented.

FIG. 7 shows a system 10 in which various embodiments of the present invention can be utilized, comprising multiple communication devices that can communicate through one or more networks. The system 10 may comprise any combination of wired or wireless networks including, but not limited to, a mobile telephone network, a wireless Local Area Network (LAN), a Bluetooth personal area network, an Ethernet LAN, a token ring LAN, a wide area network, the Internet, etc. The system 10 may include both wired and wireless communication devices.

For exemplification, the system 10 shown in FIG. 7 includes a mobile telephone network 11 and the Internet 28. Connectivity to the Internet 28 may include, but is not limited to, long range wireless connections, short range wireless connections, and various wired connections including, but not limited to, telephone lines, cable lines, power lines, and the like.

The exemplary communication devices of the system 10 may include, but are not limited to, an electronic device 12 in the form of a mobile telephone, a combination personal digital assistant (PDA) and mobile telephone 14, a PDA 16, an integrated messaging device (IMD) 18, a desktop computer 20, a notebook computer 22, etc. The communication devices may be stationary or mobile as when carried by an individual who is moving. The communication devices may also be located in a mode of transportation including, but not limited to, an automobile, a truck, a taxi, a bus, a train, a boat, an airplane, a bicycle, a motorcycle, etc. Some or all of the communication devices may send and receive calls and messages and communicate with service providers through a wireless connection 25 to a base station 24. The base station 24 may be connected to a network server 26 that allows communication between the mobile telephone network 11 and the Internet 28. The system 10 may include additional communication devices and communication devices of different types.

The communication devices may communicate using various transmission technologies including, but not limited to, Code Division Multiple Access (CDMA), Global System for Mobile Communications (GSM), Universal Mobile Telecommunications System (UMTS), Time Division Multiple Access (TDMA), Frequency Division Multiple Access (FDMA), Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, etc. A communication device involved in implementing various embodiments of the present invention may communicate using various media including, but not limited to, radio, infrared, laser, cable connection, and the like.

Figure 8:
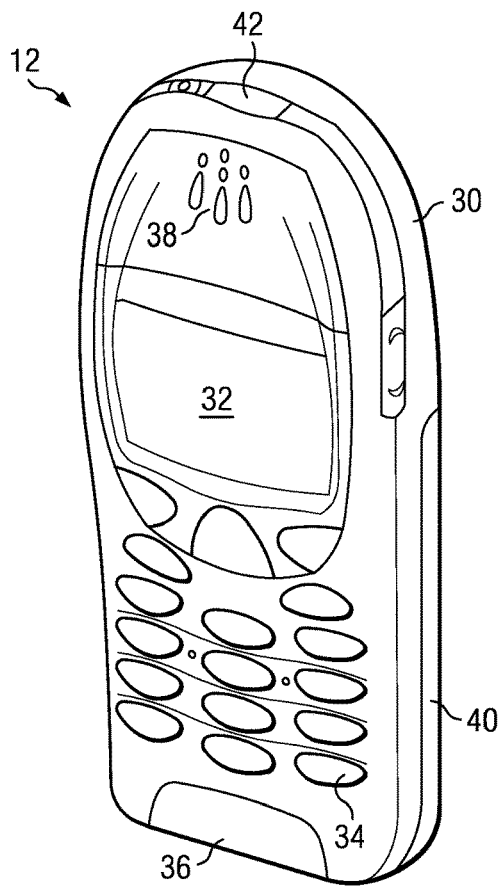
FIG. 8 illustrates a perspective view of an exemplary electronic device which may be utilized in accordance with the various embodiments of the present invention.
Figure 9:
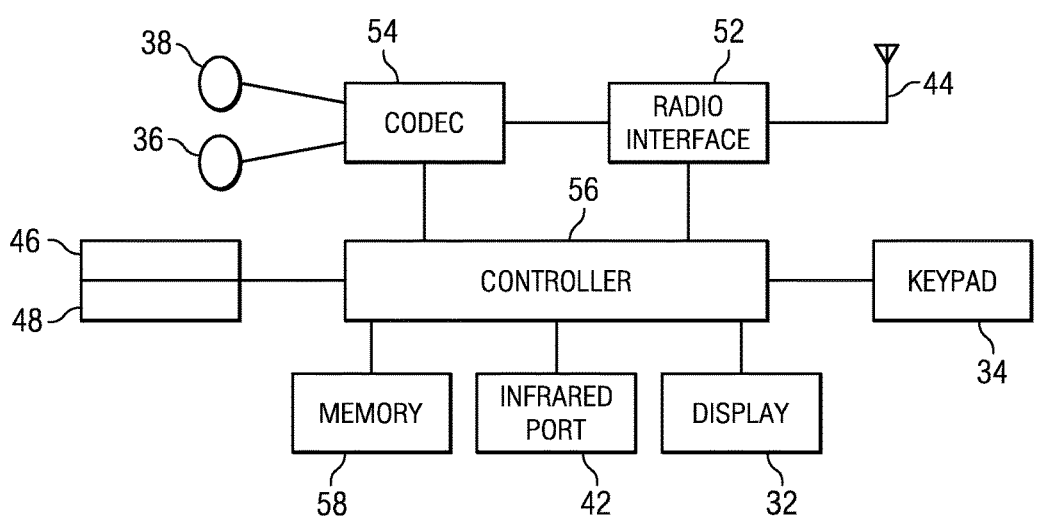
FIG. 9 is a schematic representation of the circuitry which may be included in the electronic device of FIG. 8.

FIGS. 8 and 9 show one representative electronic device 28 which may be used as a network node in accordance to the various embodiments of the present invention. It should be understood, however, that the scope of the present invention is not intended to be limited to one particular type of device. The electronic device 28 of FIGS. 8 and 9 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment, a card reader 48, radio interface circuitry 52, codec circuitry 54, a controller 56 and a memory 58. The above described components enable the electronic device 28 to send/receive various messages to/from other devices that may reside on a network in accordance with the various embodiments of the present invention. Individual circuits and elements are all of a type well known in the art, for example in the Nokia range of mobile telephones.

Figure 10:
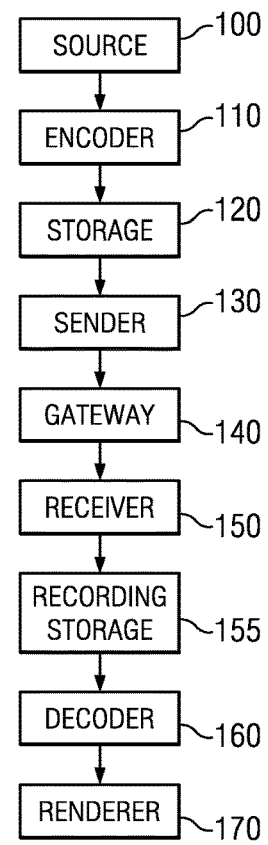
FIG. 10 is a graphical representation of a generic multi-media communication system within which various embodiments may be implemented.

FIG. 10 is a graphical representation of a generic multimedia communication system within which various embodiments may be implemented. As shown in FIG. 10, a data source 100 provides a source signal in an analog, uncompressed digital, or compressed digital format, or any combination of these formats. An encoder 110 encodes the source signal into a coded media bitstream. It should be noted that a bitstream to be decoded can be received directly or indirectly from a remote device located within virtually any type of network. Additionally, the bitstream can be received from local hardware or software. The encoder 110 may be capable of encoding more than one media type, such as audio and video, or more than one encoder 110 may be required to code different media types of the source signal. The encoder 110 may also get synthetically produced input, such as graphics and text, or it may be capable of producing coded bitstreams of synthetic media. In the following, only processing of one coded media bitstream of one media type is considered to simplify the description. It should be noted, however, that typically real-time broadcast services comprise several streams (typically at least one audio, video and text sub-titling stream). It should also be noted that the system may include many encoders, but in FIG. 10 only one encoder 110 is represented to simplify the description without a lack of generality. It should be further understood that, although text and examples contained herein may specifically describe an encoding process, one skilled in the art would understand that the same concepts and principles also apply to the corresponding decoding process and vice versa.

The coded media bitstream is transferred to a storage 120. The storage 120 may comprise any type of mass memory to store the coded media bitstream. The format of the coded media bitstream in the storage 120 may be an elementary self-contained bitstream format, or one or more coded media bitstreams may be encapsulated into a container file. Some systems operate "live", i.e. omit storage and transfer coded media bitstream from the encoder 110 directly to the sender 130. The coded media bitstream is then transferred to the sender 130, also referred to as the server, on a need basis. The format used in the transmission may be an elementary self-contained bitstream format, a packet stream format, or one or more coded media bitstreams may be encapsulated into a container file. The encoder 110, the storage 120, and the server 130 may reside in the same physical device or they may be included in separate devices. The encoder 110 and server 130 may operate with live real-time content, in which case the coded media bitstream is typically not stored permanently, but rather buffered for small periods of time in the content encoder 110 and/or in the server 130 to smooth out variations in processing delay, transfer delay, and coded media bitrate.

The server 130 sends the coded media bitstream using a communication protocol stack. The stack may include but is not limited to Real-Time Transport Protocol (RTP), User Datagram Protocol (UDP), and Internet Protocol (IP). When the communication protocol stack is packet-oriented, the server 130 encapsulates the coded media bitstream into packets. For example, when RTP is used, the server 130 encapsulates the coded media bitstream into RTP packets according to an RTP payload format. Typically, each media type has a dedicated RTP payload format. It should be again noted that a system may contain more than one server 130, but for the sake of simplicity, the following description only considers one server 130.

The server 130 may or may not be connected to a gateway 140 through a communication network. The gateway 140 may perform different types of functions, such as translation of a packet stream according to one communication protocol stack to another communication protocol stack, merging and forking of data streams, and manipulation of data stream according to the downlink and/or receiver capabilities, such as controlling the bit rate of the forwarded stream according to prevailing downlink network conditions. Examples of gateways 140 include MCUs, gateways between circuit-switched and packet-switched video telephony, Push-to-talk over Cellular (PoC) servers, IP encapsulators in digital video broadcasting-handheld (DVB-H) systems, or set-top boxes that forward broadcast transmissions locally to home wireless networks. When RTP is used, the gateway 140 is called an RTP mixer or an RTP translator and typically acts as an endpoint of an RTP connection.

The system includes one or more receivers 150, typically capable of receiving, de-modulating, and de-capsulating the transmitted signal into a coded media bitstream. The coded media bitstream is transferred to a recording storage 155. The recording storage 155 may comprise any type of mass memory to store the coded media bitstream. The recording storage 155 may alternatively or additively comprise computation memory, such as random access memory. The format of the coded media bitstream in the recording storage 155 may be an elementary self-contained bitstream format, or one or more coded media bitstreams may be encapsulated into a container file. If there are multiple coded media bitstreams, such as an audio stream and a video stream, associated with each other, a container file is typically used and the receiver 150 comprises or is attached to a container file generator producing a container file from input streams. Some systems operate "live," i.e. omit the recording storage 155 and transfer coded media bitstream from the receiver 150 directly to the decoder 160. In some systems, only the most recent part of the recorded stream, e.g., the most recent 10-minute excerption of the recorded stream, is maintained in the recording storage 155, while any earlier recorded data is discarded from the recording storage 155.

The coded media bitstream is transferred from the recording storage 155 to the decoder 160. If there are many coded media bitstreams, such as an audio stream and a video stream, associated with each other and encapsulated into a container file, a file parser (not shown in the figure) is used to decapsulate each coded media bitstream from the container file. The recording storage 155 or a decoder 160 may comprise the file parser, or the file parser is attached to either recording storage 155 or the decoder 160.

The coded media bitstream is typically processed further by a decoder 160, whose output is one or more uncompressed media streams. Finally, a renderer 170 may reproduce the uncompressed media streams with a loudspeaker or a display, for example. The receiver 150, recording storage 155, decoder 160, and renderer 170 may reside in the same physical device or they may be included in separate devices.

A sender 130 according to various embodiments may be configured to select the transmitted layers for multiple reasons, such as to respond to requests of the receiver 150 or prevailing conditions of the network over which the bitstream is conveyed. A request from the receiver can be, e.g., a request for a change of layers for display or a change of a rendering device having different capabilities compared to the previous one.

Various embodiments described herein are described in the general context of method steps or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Embodiments of the present invention may be implemented in software, hardware, application logic or a combination of software, hardware and application logic. The software, application logic and/or hardware may reside, for example, on a chipset, a mobile device, a desktop, a laptop or a server. Software and web implementations of various embodiments can be accomplished with standard programming techniques with rule-based logic and other logic to accomplish various database searching steps or processes, correlation steps or processes, comparison steps or processes and decision steps or processes. Various embodiments may also be fully or partially implemented within network elements or modules. It should be noted that the words "component" and "module," as used herein and in the following claims, is intended to encompass implementations using one or more lines of software code, and/or hardware implementations, and/or equipment for receiving manual inputs.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated.

What is claimed is:

1. A method, comprising:

encoding a top field of a first view component of an interlaced content of a first view of a multiview bitstream, wherein the multiview bitstream comprises encoded representations of view components of a plurality of different views captured by a plurality of different cameras at a plurality of different instances in time;

encoding a bottom field of the first view component of the interlaced content of the first view;

generating a reference picture list for a second view component of a second view captured by a different camera to include at least one of the following: the top field of the first view component, the bottom field of the first view component, and a first complementary field view component pair including the first view component;

performing reference picture list modification (RPLM) when a slice header contains RPLM commands, reordering intra-view and inter-view reference pictures according to a syntax element in the slice header, wherein the reference picture list and modified reference picture list contain a number of entries defined by the syntax element; and encoding a top field of the second view component based on the reference picture list, wherein the top field of the second view component of the second view is encoded with prediction from one or more of the top field and the bottom field of the first view component of the first view that was captured at a same instance in time as the second view component of the second view, but by a different camera than the camera that captured the second view;

providing a first parity flag in the multiview bitstream, the first parity flag indicating whether the top field of the first view component or the bottom field of the first view component is used in encoding the top field of the second view component;

encoding a bottom field of the second view component based on the reference picture list, wherein the bottom field of the second view component of the second view is encoded with prediction from one or more of the top field and the bottom field of the first view component of the first view that was captured at the same instance in time as the second view component of the second view, but by a different camera than the camera that captured the second view; and providing a second parity flag in the multiview bitstream, the second parity flag indicating whether the top field of the first view component or the bottom field of the first view component is used in encoding the bottom field of the second view component, wherein providing the first and second parity flags comprises, in an instance in which the first parity flag indicates that the top field of the first view component is used in encoding the top field of the second view component, the second parity flag is provided so as to indicate that the bottom field of the first view component is used in encoding the bottom field of the second view component.

2. The method of claim 1, wherein the second view component comprises a second field view component; a coded frame is inter-view predicted from a complementary reference field pair; and the reference picture list for the second view component includes a first field view component.

3. The method of claim 1, wherein the first view component is a first frame view component and the second view component comprises a second field view component, and wherein the reference picture list for the second view component includes a first field view component based on the first frame view component.

4. A method, comprising:

decoding a top field of a first view component of an interlaced content of a first view from a multiview bitstream, wherein the multiview bitstream comprises encoded representations of view components of a plurality of different views captured by a plurality of different cameras at a plurality of different instances in time;

decoding a bottom field of the first view component of the interlaced content of the first view;

generating a reference picture list for a second view component of a second view to include at least one of the following: the top field of the first view component, the bottom field of the first view component, and a first complementary field view component pair including the first view component;

performing reference picture list modification (RPLM) when a slice header contains RPLM commands, reordering intra-view and inter-view reference pictures according to a syntax element in the slice header, wherein the reference picture list and modified reference picture list contain a number of entries defined by the syntax element; and receiving a first parity flag in the multiview bitstream, the first parity flag indicating whether the top field of the first view component or the bottom field of the first view component is used in encoding a top field of the second view component;

decoding a top field of the second view component of the second view from the multi-view video stream using the reference picture list and the received first parity flag, wherein the top field of the second view component of the second view is decoded with prediction from one or more of the top field and the bottom field of the first view component of the first view that was captured at a same instance in time as the second view component of the second view, but by a different camera than the camera that captured the second view;

receiving a second parity flag in the multiview bitstream, the second parity flag indicating whether the top field of the first view component or the bottom field of the first view component is used in encoding a bottom field of the second view component, wherein receiving the first and second parity flags comprises, in an instance in which the first parity flag indicates that the top field of the first view component is used in encoding the top field of the second view component, the second parity flag that is received indicates that the bottom field of the first view component is used in encoding the bottom field of the second view component; and decoding a bottom field of the second view component of the second view from the multi-view video stream using the reference picture list and the received second parity flag, wherein the top field of the second view component of the second view is decoded with prediction from one or more of the top field and the bottom field of the first view component of the first view that was captured at the same instance in time as the second view component of the second view, but by a different camera than the camera that captured the second view.

5. The method of claim 4, wherein the second view component comprises a second field view component; a coded frame is inter-view predicted from a complementary reference field pair; and the reference picture list for the second view component includes a first field view component.

6. The method of claim 4, wherein the first view component is a first frame view component and the second view component comprises a second field view component, and
wherein the reference picture list for the second view component includes a first field view component based on the first frame view component.

7. An apparatus, comprising:
a processor; and
a memory unit communicatively connected to the processor, the apparatus configured to:
encode a top field of a first view component of an interlaced content of a first view of a multiview bitstream, wherein the multiview bitstream comprises encoded representations of view components of a plurality of different views captured by a plurality of different cameras at a plurality of different instances in time;
encode a bottom field of the first view component of the interlaced content of the first view;
generate a reference picture list for a second view component of a second view to include at least one of the following: the top field of the first view component, the bottom field of the first view component, and a first complementary field view component pair including the first view component; and the second view component based on the reference picture list;
perform reference picture list modification (RPLM) when a slice header contains RPLM commands, reordering intra-view and inter-view reference pictures according to a syntax element in the slice header, wherein the reference picture list and modified reference picture list contain a number of entries defined by the syntax element; and
encode a top field of the second view component based on the reference picture list, wherein the top field of the second view component of the second view is encoded with prediction from one or more of the top field and the bottom field of the first view component of the first view that was captured at a same instance in time as the second view component of the second view, but by a different camera than the camera that captured the second view;
provide a first parity flag in the multiview bitstream, the first parity flag indicating whether the top field of the first view component or the bottom field of the first view component is used in encoding the top field of the second view component;
encode a bottom field of the second view component based on the reference picture list, wherein the bottom field of the second view component of the second view is encoded with prediction from one or more of the top field and the bottom field of the first view component of the first view that was captured at the same instance in time as the second view component of the second view, but by a different camera than the camera that captured the second view; and
provide a second parity flag in the multiview bitstream, the second parity flag indicating whether the top field of the first view component or the bottom field of the first view component is used in encoding the bottom field of the second view component,
wherein the apparatus is configured to provide the first and second parity flags such that, in an instance in which the first parity flag indicates that the top field of the first view component is used in encoding the top field of the second view component, the second parity flag is provided so as to indicate that the bottom field of the first view component is used in encoding the bottom field of the second view component.

8. The apparatus of claim 7, wherein the second view component comprises a second field view component; a coded frame is inter-view predicted from a complementary reference field pair; and the reference picture list for the second view component includes a first field view component.

9. The apparatus of claim 7, wherein the first view component is a first frame view component and the second view component comprises a second field view component, and
wherein the reference picture list for the second view component includes a first field view component based on the first frame view component.

10. An apparatus, comprising:
a processor; and
a memory unit communicatively connected to the processor, the apparatus configured to:
decode a top field of a first view component of an interlaced content of a first view from a multiview bitstream, wherein the multiview bitstream comprises encoded representations of view components of a plurality of different views captured by a plurality of different cameras at a plurality of different instances in time;
decode a bottom field of the first view component of the interlaced content of the first view;
generate a reference picture list for a second view component of a second view to include at least one of the following: the top field of the first view component, the bottom field of the first view component, and a first complementary field view component pair including the first view component;
perform reference picture list modification (RPLM) when a slice header contains RPLM commands, reordering intra-view and inter-view reference pictures according to a syntax element in the slice header, wherein the reference picture list and modified reference picture list contain a number of entries defined by the syntax element; and
receive a first parity flag in the multiview bitstream, the first parity flag indicating whether the top field of the first view component or the bottom field of the first view component is used in encoding a top field of the second view component;
decode a top field of the second view component of the second view from the multi-view video stream using the reference picture list and the received first parity flag, wherein the top field of the second view component of the second view is decoded with prediction from one or more of the top field and the bottom field of the first view component of the first view that was captured at a same instance in time as the second view component of the second view, but by a different camera than the camera that captured the second view;
receive a second parity flag in the multiview bitstream, the second parity flag indicating whether the top field of the first view component or the bottom field of the first view component is used in encoding a bottom field of the second view component, wherein the apparatus is configured to receive the first and second parity flags by, in an instance in which the first parity flag indicates that the top field of the first view component is used in encoding the top field of the second view component, the second parity flag that is received indicates that the bottom field of the first view component is used in encoding the bottom field of the second view component; and decode a bottom field of the second view component of the second view from the multi-view video stream using the reference picture list and the received second parity flag, wherein the top field of the second view component of the second view is decoded with prediction from one or more of the top field and the bottom field of the first view component of the first view that was captured at the same instance in time as the second view component of the second view, but by a different camera than the camera that captured the second view.

11. The apparatus of claim 10, wherein the second view component comprises a second field view component; a coded frame is inter-view predicted from a complementary reference field pair; and the reference picture list for the second view component includes a first field view component.

12. The apparatus of claim 10, wherein the first view component is a first frame view component and the second view component comprises a second field view component, and wherein the reference picture list for the second view component includes a first field view component based on the first frame view component.

13. A computer program product comprising a non-transitory computer-readable medium having computer executable instructions stored thereon, said instructions, when executed by a processor, causing an apparatus to perform the process of:

encoding a top field of a first view component of an interlaced content of a first view of a multiview bitstream, wherein the multiview bitstream comprises encoded representations of view components of a plurality of different views captured by a plurality of different cameras at a plurality of different instances in time;

encoding a bottom field of the first view component of the interlaced content of the first view;

generating a reference picture list for a second view component of a second view to include at least one of the following: the top field of the first view component, the bottom field of the first view component, and a first complementary field view component pair including the first view component;

performing reference picture list modification (RPLM) when a slice header contains RPLM commands, reordering intra-view and inter-view reference pictures according to a syntax element in the slice header, wherein the reference picture list and modified reference picture list contain a number of entries defined by the syntax element; and encoding a top field of the second view component based on the reference picture list, wherein the top field of the second view component of the second view is encoded with prediction from one or more of the top field and the bottom field of the first view component of the first view that was captured at a same instance in time as the second view component of the second view, but by a different camera than the camera that captured the second view;

providing a first parity flag in the multiview bitstream, the first parity flag indicating whether the top field of the first view component or the bottom field of the first view component is used in encoding the top field of the second view component;

encoding a bottom field of the second view component based on the reference picture list, wherein the bottom field of the second view component of the second view is encoded with prediction from one or more of the top field and the bottom field of the first view component of the first view that was captured at the same instance in time as the second view component of the second view, but by a different camera than the camera that captured the second view; and providing a second parity flag in the multiview bitstream, the second parity flag indicating whether the top field of the first view component or the bottom field of the first view component is used in encoding the bottom field of the second view component, wherein providing the first and second parity flags comprises, in an instance in which the first parity flag indicates that the top field of the first view component is used in encoding the top field of the second view component, the second parity flag is provided so as to indicate that the bottom field of the first view component is used in encoding the bottom field of the second view component.

14. The computer program product of claim 13, wherein the second view component comprises a second field view component; a coded frame is inter-view predicted from a complementary reference field pair; and the reference picture list for the second view component includes a first field view component.

15. The computer program product of claim 13, wherein the first view component is a first frame view component and the second view component comprises a second field view component, and wherein the reference picture list for the second view component includes a first field view component based on the first frame view component.

16. A computer program product comprising a non-transitory computer-readable medium having computer executable instructions stored thereon, said instructions, when executed by a processor, causing an apparatus to perform the process of:

decoding a top field of a first view component of an interlaced content of a first view from a multiview bitstream, wherein the multiview bitstream comprises encoded representations of view components of a plurality of different views captured by a plurality of different cameras at a plurality of different instances in time;

decoding a bottom field of the first view component of the interlaced content of the first view;

generating a reference picture list for a second view component of a second view to include at least one of the following: the top field of the first view component, the bottom field of the first view component, and a first complementary field view component pair including the first view component;

performing reference picture list modification (RPLM) when a slice header contains RPLM commands, reordering intra-view and inter-view reference pictures according to a syntax element in the slice header, wherein the reference picture list and modified reference picture list contain a number of entries defined by the syntax element; and receiving a first parity flag in the multiview bitstream, the first parity flag indicating whether the top field of the first view component or the bottom field of the first view component is used in encoding a top field of the second view component;

decoding a top field of the second view component of the second view from the multi-view video stream using the reference picture list and the received first parity flag, wherein the top field of the second view component of the second view is decoded with prediction from one or more of the top field and the bottom field of the first view component of the first view that was captured at a same instance in time as the second view component of the second view, but by a different camera than the camera that captured the second view;

receiving a second parity flag in the multiview bitstream, the second parity flag indicating whether the top field of the first view component or the bottom field of the first view component is used in encoding a bottom field of the second view component, wherein receiving the first and second parity flags comprises, in an instance in which the first parity flag indicates that the top field of the first view component is used in encoding the top field of the second view component, the second parity flag that is received indicates that the bottom field of the first view component is used in encoding the bottom field of the second view component; and decoding a bottom field of the second view component of the second view from the multi-view video stream using the reference picture list and the received second parity flag, wherein the top field of the second view component of the second view is decoded with prediction from one or more of the top field and the bottom field of the first view component of the first view that was captured at the same instance in time as the second view component of the second view, but by a different camera than the camera that captured the second view.

17. The computer program product of claim 16, wherein the second view component comprises a second field view component; a coded frame is inter-view predicted from a complementary reference field pair; and the reference picture list for the second view component includes a first field view component.

18. The computer program product of claim 16, wherein the first view component is a first frame view component and the second view component comprises a second field view component, and wherein the reference picture list for the second view component includes a first field view component based on the first frame view component.

* * * * *